(12) United States Patent
Baumann et al.

(10) Patent No.: US 7,371,016 B2
(45) Date of Patent: May 13, 2008

(54) METHOD FOR PRODUCING AN OPTICAL ARRANGEMENT

(75) Inventors: Ingo Baumann, Zorneding (DE);
Detlef Krabe, Markt Schwaben (DE);
Manfred Scheubeck, Augsburg (DE);
Andreas Schumacher, München (DE)

(73) Assignee: Finisar Corporation, Sunnyvale, CA (US)

( * ) Notice: Subject to any disclaimer, the term of this patent is extended or adjusted under 35 U.S.C. 154(b) by 728 days.

(21) Appl. No.: 10/686,982

(22) Filed: Oct. 16, 2003

(65) Prior Publication Data

US 2005/0053327 A1 Mar. 10, 2005

(30) Foreign Application Priority Data

Oct. 17, 2002 (DE) ................. 102 48 969

(51) Int. Cl.
*G02B 6/26* (2006.01)
*G02B 6/42* (2006.01)
(52) U.S. Cl. .................... 385/90; 385/52; 385/38
(58) Field of Classification Search ............ 385/90–91, 385/38, 52, 16–23
See application file for complete search history.

(56) References Cited

U.S. PATENT DOCUMENTS 4,065,203 A * 12/1977 Goell et al. ............. 385/91
5,367,584 A 11/1994 Ghezzo et al.
6,490,392 B1 * 12/2002 Munekata et al. ........... 385/31
6,748,131 B2 * 6/2004 Steinberg et al. ............ 385/20
2003/0142926 A1 * 7/2003 Dallas et al. ............... 385/91

FOREIGN PATENT DOCUMENTS

EP 1 085 354 A2 3/2001

OTHER PUBLICATIONS

"GaAs-based microelectromechanical waveguide switch", Olga Blum Spahn, Charles Sullivan, Jeff Burkhart, Chris Tigges and Ernie Garcia, IEEE/LEOS International Conference on Optical MEMS, Sheraton Kauai, Resort Kauai, Hawaii, Aug. 21024, 2000, 3 pgs.

* cited by examiner

*Primary Examiner*—Michelle R. Connelly-Cushwa
*Assistant Examiner*—Jerry T. Rahll
(74) *Attorney, Agent, or Firm*—Workman Nydegger

(57) ABSTRACT

The invention relates to a method for producing an optical arrangement (10, 300), in which an optical component (355, 20) is optically connected to at least one waveguide (90, 320, 330) provided on or in a carrier substrate (100, 310). In order to enable an optical component to be connected to an optical waveguide of a carrier substrate in a particularly simple and thus cost-effective manner, the invention provides for there to be arranged between the optical component (20, 355) and the waveguide (90, 320, 330) an adjustment device (40, 350) with at least one auxiliary waveguide (60, 410, 440), the waveguide ends (50, 70, 400, 420, 430, 450) of which are in each case movable and an optical adjustment between the optical component (20, 355) and the waveguide (90, 320, 330) of the carrier substrate (100, 310) is effected by a mechanical adjustment of the movable waveguide ends (50, 70, 400, 420, 430, 450).

30 Claims, 3 Drawing Sheets

METHOD FOR PRODUCING AN OPTICAL ARRANGEMENT

REFERENCE TO RELATED APPLICATIONS

This application claims the benefit of the priority date of German application DE 102 48 969.6-51, filed on Oct. 17, 2002, the contents of which are herein incorporated by reference in their entirety.

FIELD OF THE INVENTION

The present invention is directed to optical components, and more particularly to an optical system and method for coupling an optical component to a waveguide.

BACKGROUND OF THE INVENTION

In optical telecommunications technology increasingly complex devices are being created which combine a plurality of optical and optoelectrical functions in a common optical arrangement, in particular on a common platform or a common substrate. Examples of such functions or functional elements are optical filters, switches, attenuators, transmitters, amplifiers or receivers. Carriers having combined mechanical, optical, electrical and also thermal functionalities are increasingly being used as the platform. Examples thereof are "electrical optical circuit boards" (EOCB), which are usually used for multimode application, or so-called "planar lightwave circuits" (PLC), that is to say so-called planar optical circuits which are used for multi- or single-mode applications.

By way of example, the lightwave circuit in accordance with the published European patent application EP 1 085 354 A1 lies in this field of optical telecommunications technology. Thus, in this previously known method, a photodetector as optical component is placed onto a carrier substrate, to be precise in such a way that the photodetector is optically connected to a waveguide provided in or on the carrier substrate.

The invention is based on the object of specifying a method by which an optical component can be connected to an optical waveguide of a carrier substrate in a particularly simple and thus cost-effective manner.

SUMMARY OF THE INVENTION

Accordingly, it is provided that, in the method according to the invention, an adjustment device with at least one auxiliary waveguide is additionally arranged between the optical component and the waveguide. In this case, the waveguide ends of the auxiliary waveguide are intended to be movable in order that an adjustment of the optical connection between the optical component and the waveguide of the carrier substrate is still possible after the mounting of the optical component.

One essential advantage of the method according to the invention is to be seen in the fact that, when mounting the optical component, it is not necessary to make particularly stringent requirements of the adjustment or mounting accuracy; this is because even after the mounting of the optical component on the carrier substrate, for example a "platform", an adjustment of the optical connection between the component and the waveguide of the carrier substrate is still possible, namely by the auxiliary waveguide of the adjustment device being correspondingly set or adjusted.

A further essential advantage of the method according to the invention is to be seen in the fact that it can be carried out in a very simple and thus cost-effective manner. Thus, specifically, the automatic placement machines ("pick and place" machines) that are customary nowadays, as are used in the semiconductor industry, can be used for the mounting of the optical component. These automatic placement machines usually have manufacturing tolerances, in other words mounting tolerances, which are of the order of magnitude of between 5 and 10 μm. As is known, mounting tolerances of this magnitude are totally unacceptable in optical communication applications, primarily in single-mode applications, since, with such large tolerances, an optical coupling or optical connection between different components is possible in poor fashion, i.e. with unnecessary attenuations, or is no longer possible at all. In single-mode applications, mounting tolerances must not exceed a limit value of approximately 1 μm if low-loss optical connections are to be achieved.

It is at this point that the invention begins in concrete terms: thus, in the case of the method according to the invention for optically coupling an optical component to a waveguide of a carrier substrate, although an additional component is accepted, which is associated with additional costs and additional production outlay, this additional adjustment device nevertheless makes it possible to use the hitherto customary automatic placement machines. Additional expensive and complicated adjustment devices as would be necessary for mounting optical components on a carrier substrate with micrometer accuracy are not necessary in the case of the method according to the invention. Passive adjustment elements such as, for example, precision micromechanical stops, as are likewise known and customary in the case of mounting accuracies in the micrometer range, are not necessary in the case of the method according to the invention; therefore, the high-precision structuring processes for producing such adjustment elements, for example the precision micromechanical stops mentioned, are likewise obviated.

A third essential advantage of the method according to the invention is to be seen in the fact that an optical readjustment between the optical component and the waveguide of the carrier substrate always remains possible in the case of the method according to the invention since the adjustment device enables a readjustment even after the mounting of the optical component. It can be stated in summary, then, that the heart of the invention consists in the fact that the additional provision of an adjustment device with movable waveguide ends enables the use of the automatic placement machines known from semiconductor technology with relatively high mounting inaccuracy (inaccuracy of up to approximately 10 μm).

An advantageous development of the method according to the invention provides for this method to be used to mount an optical component on an electrical optical carrier system, for example an electrical optical motherboard, as carrier substrate. The electrical optical carrier system may be for example an electrical optical circuit board or a planar lightwave circuit. As already described above, EOCBs and PLCs have very many functions and thus also functional elements such as e.g. optical filters, switches, attenuators, transmitters, amplifiers or receivers. In order to avoid a complicated adjustment during the production of such "boards" or optical printed circuit boards, the use of the method according to the invention is regarded as advantageous in the case of said boards or printed circuit boards.

The adjustment device can be produced particularly simply and thus advantageously if it is formed by an auxiliary substrate in which or on which is provided the at least one auxiliary waveguide with its movable waveguide ends. Substrates with, situated therein or thereon, waveguides with movable waveguide ends are disclosed for example in the article "GaAs-based microelectromechanical waveguide switch", Olga Blum Spahn, Charles Sullivan, Jeff Burkhart, Chris Tigges, Ernie Garcia, Sandia National Laboratories, Albuquerque, USA, 2000 IEEE/LEOS International Conference on Optical MEMS, Sheraton Kauai, Resort, Kauai, Hi., 21-24 August 2000, TuA5, pages 41 and 42, which is hereby incorporated by reference in its entirety. This is because when the at least one auxiliary waveguide is integrated in or on an auxiliary substrate, it can be ensured that recourse can be had to the customary fabrication techniques from microelectronics or from integrated optics in the production of the adjustment device.

The arrangement comprising the optical component, the carrier substrate and the adjustment device can be mounted particularly simply and thus advantageously by a procedure in which the optical component is firstly mounted on the adjustment device and the adjustment device provided with the optical component is subsequently connected to the carrier substrate.

In order to enable the optical arrangement produced to be particularly space-saving, it is regarded as advantageous if the adjustment device with the optical component mounted thereon is inserted into a depression at the surface of the carrier substrate.

This depression should advantageously be dimensioned in such a way that the waveguides of the adjustment device and those of the carrier substrate lie in one plane. The adjustment device and the carrier substrate may advantageously form a common planar surface. It is possible to have recourse to the known "embedding technique" in the arrangement of the components or the "spatial" integration.

The situation in which the adjustment device and the carrier substrate lie in one plane can be achieved particularly simply and thus advantageously by a procedure in which fixing elements are formed at the adjustment device and/or at the carrier substrate, by means of which the adjustment device is suspended in the depression of the carrier substrate.

It is regarded as advantageous, moreover, if the fixing elements are simultaneously used for contact connection between the carrier substrate and the adjustment device, since additional electrical contacts are then saved. Indirectly this also simplifies the contact connection between the carrier substrate and the optical component.

Another advantageous refinement of the method according to the invention provides for the adjustment device and the carrier substrate to be mounted on a separate carrier. Such a separate arrangement of carrier substrate and adjustment device is recommendable particularly when even further components are intended to be provided on the separate carrier.

It will quite generally be unavoidable that joints or cavities will still be present between the optical component, the carrier substrate and the adjustment device after mounting. Therefore, it is regarded as advantageous if these cavities are filled with a composite composition. This composite composition should preferably be configured in such a way that its refractive index is adapted to the refractive index of the adjustment device, of the carrier substrate, of the waveguides in the carrier substrate and/or of the optical component in order to avoid optical reflections. The composite composition may have, in particular, an average refractive index in order to achieve an optimum adaptation.

The adjustment device can be formed in a particularly space-saving manner and thus advantageously in that the at least one waveguide is integrated in the adjustment device, to be precise in such a way that its waveguide ends can be deflected and adjusted by means of electrostatic, magnetic, thermal, piezoelectric and/or thermomechanical forces.

A particularly low-loss coupling between the optical component and the auxiliary waveguide or the auxiliary waveguide and the waveguide of the carrier substrate can be achieved when an adjustment is possible (two-dimensionally). This can be achieved in concrete terms when the ends of the auxiliary waveguide are in each case movable in the area perpendicular to the longitudinal direction of the auxiliary waveguide and thus perpendicular to the direction of propagation of the light in the auxiliary waveguide—that is to say two-dimensionally. As an alternative or else in addition, the ends of the auxiliary waveguide may be movable along an axis of rotation perpendicular to the longitudinal axis of the auxiliary waveguide—that is to say horizontally, as it were.

It is not always the aim to produce a connection between an optical component and the waveguide of the carrier substrate that is as loss-free as possible; thus, sometimes a predetermined amount of attenuation is desirable for the optical connection. In order to achieve such an attenuation, it is regarded as advantageous if the auxiliary waveguide is incorrectly adjusted in a targeted manner in order to achieve the predetermined attenuation between the optical element and the waveguide of the carrier substrate.

It is furthermore regarded as advantageous if optical components which have an optical input and an optical output are mounted. Such optical components include for example semiconductor lasers and semiconductor optical amplifiers (SOA). In order to be able to mount these components particularly simply and thus advantageously, at least two adjustable auxiliary waveguides are advantageously provided in the adjustment device, and are in each case optically connected to the optical component and the carrier substrate. It is advantageous, then, if the adjustment device is provided with a corresponding number of auxiliary waveguides for adjustment purposes.

An optical arrangement can be formed particularly simply and thus advantageously if a glass or silicon substrate is used as the carrier substrate, since it is possible to have recourse to the known waveguide technology—e.g., based on glass waveguides—in such a case. It goes without saying that other waveguides such as, for example, polymer waveguides or SOI waveguides (SOI: silicon on insulator) may be formed on glass or silicon substrates.

In order to achieve the situation in which the least possible optical losses occur between the auxiliary waveguide and the optical component or between the auxiliary waveguide and the waveguide of the carrier substrate, it is regarded as advantageous if the auxiliary waveguide is produced in such a way that its mode field is adapted to that of the waveguide of the carrier substrate and/or to that of the optical component.

Moreover, it is regarded as advantageous if holding elements are provided which, after the waveguide ends of the adjustment device have been adjusted, fix the waveguide ends in the adjusted position. The holding elements may be for example mechanical latching elements and/or also elements based exclusively on existing static friction. An essential advantage of such holding elements is that the adjustment device, once the waveguide ends have been adjusted, no longer has to be driven electrically, for example, in order to maintain the adjustment, specifically because the position of the waveguide ends remains fixed.

The invention additionally relates to an optical arrangement having an optical component connected to a carrier substrate with at least one optical waveguide.

Such an optical arrangement can be gathered for example from the European patent application specified in the introduction.

With regard to such an optical arrangement, the invention is based on the object of improving it in such a way that it can be produced particularly simply and thus cost-effectively.

With regard to the advantages of the arrangement according to the invention and the advantages of the advantageous refinements of the arrangement according to the invention, reference is made to the corresponding explanations in connection with the method according to the invention.

BRIEF DESCRIPTION OF THE DRAWINGS

In order to elucidate the invention.

DETAILED DESCRIPTION OF THE INVENTION

Figure 1:
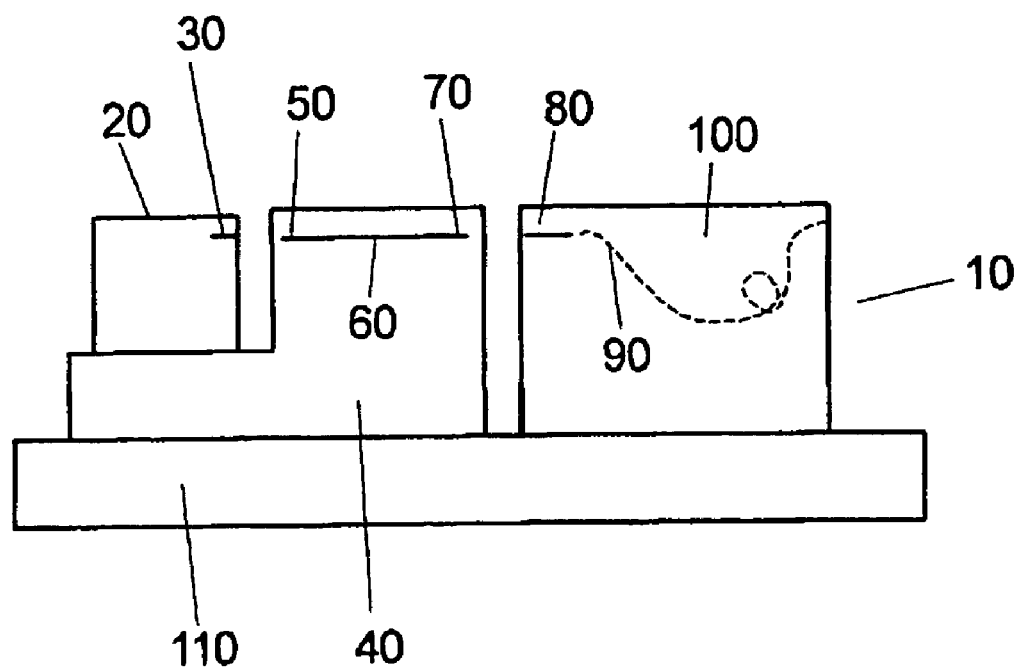
FIG. 1 shows an exemplary embodiment of an arrangement according to the invention which has been produced by the method according to the invention, to be precise in side view.

FIG. 1 shows an optical arrangement 10 having an optical component 20, which has an optical connection 30. The optical component 20 is mounted on an auxiliary substrate 40, to be precise in such a way that the connection 30 of the optical component 20 lies opposite a waveguide end 50 of an auxiliary waveguide 60 of the auxiliary substrate 40.

The auxiliary waveguide 60 has a second waveguide end 70, which lies opposite a waveguide end 80 of a waveguide 90. This waveguide 90 is integrated in a carrier substrate 100.

The auxiliary substrate 40 and the carrier substrate 100 are mounted on a separate carrier 110 in this case.

The optical component 20 may be for example an optical emission element such as a laser or a light-emitting diode or else an optical reception element such as a photodiode.

The auxiliary substrate 40 may be for example a glass substrate or a silicon substrate in which or on which optical waveguides are integrated as auxiliary waveguide 60. The auxiliary waveguide 60 may be for example a glass waveguide or a polymer waveguide or the like.

Figure 2:
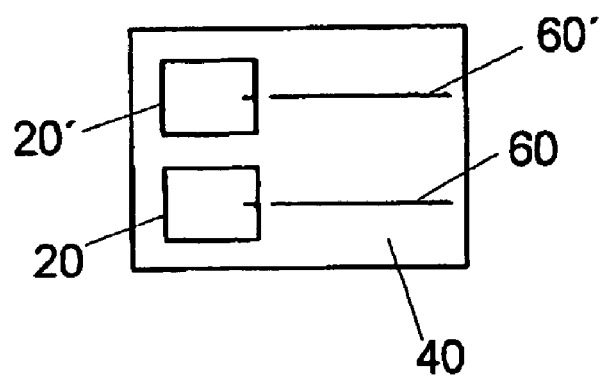
FIG. 2 shows the exemplary embodiment in accordance with FIG. 1 in plan view.

FIG. 2 shows the auxiliary substrate 40 with the optical component 20 in plan view. Besides the optical component 20 and the auxiliary waveguide 60, the figure reveals a further optical component 20' assigned to a further auxiliary waveguide 60'. FIG. 2 thus indicates that not just one optical component 20 but two or as many other optical components as desired can be fixed on the auxiliary substrate 40. In a corresponding manner, on the carrier substrate 100 in accordance with FIG. 1 provision may be made of corresponding waveguide ends 80 and waveguides 90 which provide the corresponding optical connections for the said optical components 20, 20' etc.

The optical arrangement 10 in accordance with FIGS. 1 and 2 is preferably produced according to the following method. Firstly, the optical component 20 is mounted on the auxiliary substrate 40. A standard automatic placement machine can be used for this mounting, since adjustment tolerances of 5 to 10 μm can be accepted. This is because if the connection 30 of the optical component 20 does not lie exactly opposite the first end 50 of the auxiliary waveguide 60, then the first end 50 of the auxiliary waveguide 60 can be deflected in a subsequent adjustment step. In this case, this deflection is carried out in such a way as to achieve as optimum a coupling as possible between the optical component 20 and the auxiliary waveguide 60 of the auxiliary substrate 40.

Once the optical component 20 has been fixed on the auxiliary substrate, the auxiliary substrate 40 is fixed on the separate carrier 110. In addition, the carrier substrate 100 is mounted on the separate carrier 110. A standard automatic placement machine can again be used for the mounting of the auxiliary substrate 40 and of the carrier substrate 100, since mounting accuracies of the order of magnitude of between 5 and 10 μm are again sufficient. This is because if the waveguide end 80 of the waveguide 90 of the carrier substrate 100 does not lie exactly opposite the second waveguide end 70 of the auxiliary waveguide 60, then the second waveguide end 70 can be readjusted from its position in a subsequent adjustment step, namely because the second waveguide end 70— in the same way as the first waveguide end 50— of the auxiliary waveguide 60 is embodied in movable fashion. The second waveguide end 70 is thus moved and adjusted until an optimum coupling is achieved between the auxiliary waveguide 60 and the waveguide 90 of the carrier substrate 100.

In summary, in the case of the optical arrangement in accordance with FIGS. 1 and 2, the optical connection between the optical component 20 and the waveguide 90 of the carrier substrate 100 is adjusted only after the mounting of the elements, namely by the two waveguide ends 50 and 70 of the auxiliary waveguide 60 of the auxiliary substrate 40 being readjusted until an ideal optical coupling to the optical component 20, on the one hand, and the waveguide 90 of the carrier substrate 100, on the other hand, is achieved.

A deflection of the two waveguide ends 50 and 70 can be achieved in this case if the two waveguide ends 50 and 70 "lie free". The manner in which it is possible for the two waveguide ends 50 and 70 to "lie free" in this way is shown in detail in FIG. 3.

Figure 3:
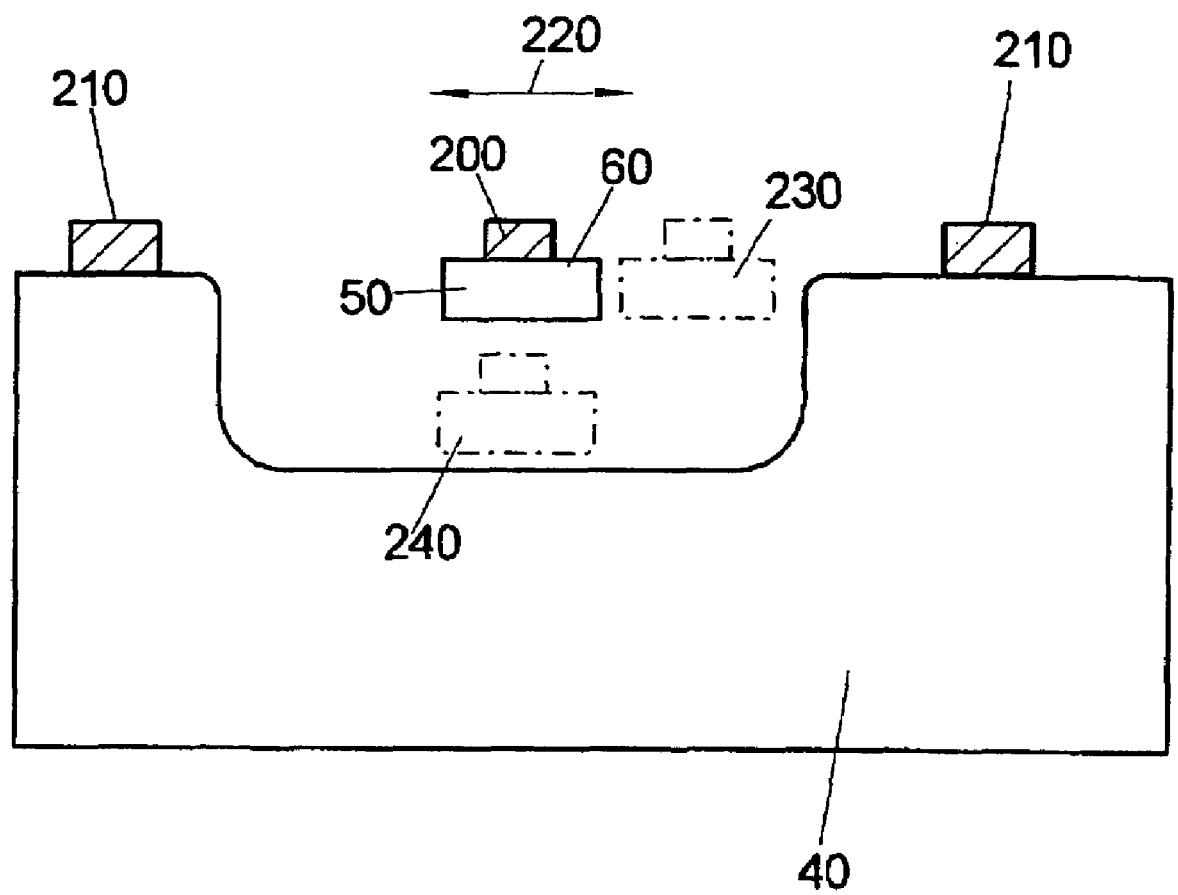
FIG. 3 shows an exemplary embodiment of an adjustment device for the exemplary embodiment in accordance with FIGS. 1 and 2 and for the exemplary embodiment in accordance with FIGS. 4 and 5.

Thus, FIG. 3 reveals the waveguide end 50 of the auxiliary waveguide 60 in cross section. The waveguide end 50 lies free and has no mechanical connection in the lateral or vertical direction to the auxiliary substrate 40.

An electrical contact 200 is applied on the auxiliary waveguide 60 in the region of the waveguide end 50, the said electrical contact being connected to further electrical contacts 210 on the auxiliary substrate 40. If an electrical voltage is then applied between the connection 200 and one of the two connections 210, then a lateral deflection of the waveguide end 50 occurs on account of the electrostatic forces which form. This is indicated by a double arrow 220 in FIG. 3. The deflected position of the waveguide end 50 is identified by the reference symbol 230.

Thus, an adjustment of the waveguide end 50 relative to the connection 30 of the optical component 20 can be achieved by applying a corresponding voltage to the connections 200 and 210.

The second waveguide end 70 of the auxiliary waveguide 60 can also be deflected in a corresponding manner in order to achieve the optical coupling to the waveguide 90 of the carrier substrate 100.

Moreover, further electrical connections may be provided above and/or below the two waveguide ends 50 and 70 of the auxiliary waveguide 60, which connections enable the waveguide ends to be adjusted vertically. This is indicated in FIG. 3 by the reference symbol 240, identifying a vertically deflected position of the waveguide end 50.

The adjustment device in accordance with FIG. 3 may be formed for example in a silicon or glass substrate.

Moreover, the optical component 20 does not have to be fixed on the auxiliary substrate 40; instead, the optical component 20, the auxiliary substrate 40 and the carrier substrate may also be arranged alongside one another on the separate carrier 110.

Figure 4:
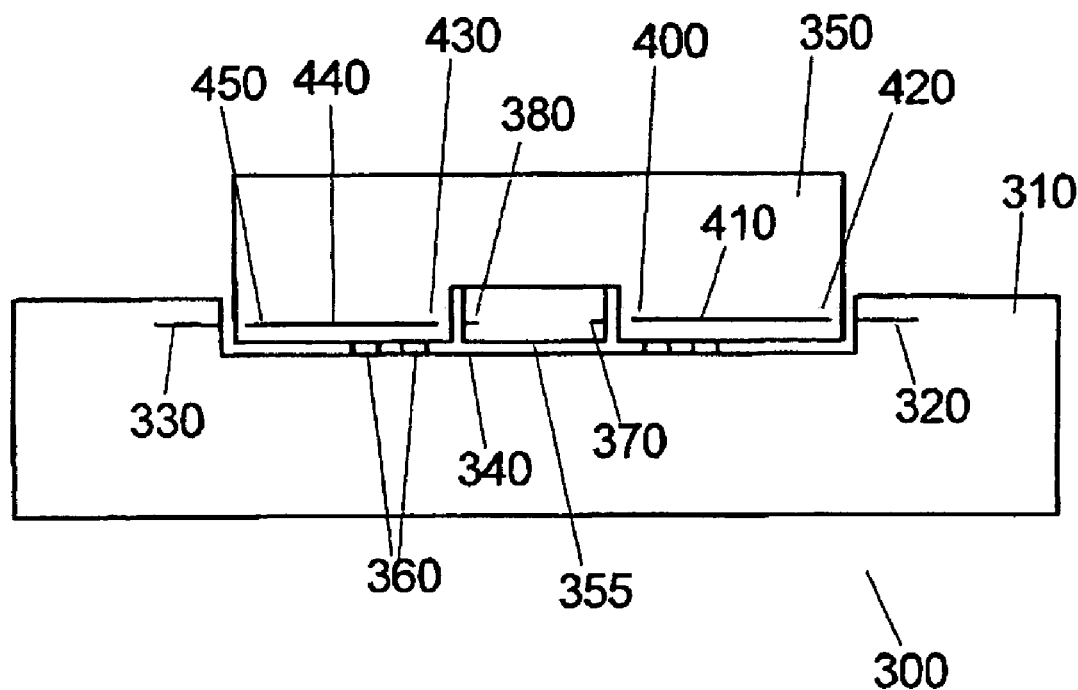
FIG. 4 shows a further exemplary embodiment of an optical arrangement according to the invention which has been produced by the method according to the invention, to be precise in side view.

FIG. 4 shows a further exemplary embodiment of an optical arrangement according to the invention. This optical arrangement bears the reference symbol 300 in FIG. 4. The optical arrangement 300 has a carrier substrate 310 with a first waveguide 320 and a second waveguide 330. A depression 340 is provided in the carrier substrate 310, an adjustment device formed by an auxiliary substrate 350 being inserted into the said depression. The connection between the auxiliary substrate 350 and the carrier substrate 310 is ensured by adjustment bumps 360 as fixing elements.

An optical component 355 is mounted at the auxiliary substrate 350. This optical component 355 is a laser amplifier with two connections 370 and 380.

The first connection 370 is optically connected to a first waveguide end 400 of a first auxiliary waveguide 410. The first auxiliary waveguide 410 has a second waveguide end 420, which is optically connected to the first waveguide 320 of the carrier substrate 310.

The second connection 380 of the optical component 355 lies opposite a first waveguide end 430 of a second auxiliary waveguide 440. The second waveguide end 450 of the second auxiliary waveguide 440 is in turn arranged in such a way that it is optically connected to the second waveguide 330 of the carrier substrate 310.

Figure 5:
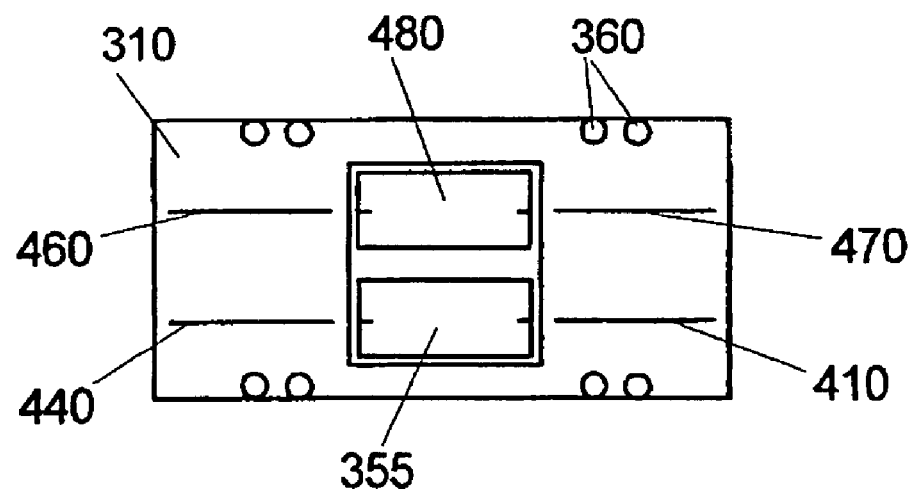
FIG. 5 shows the exemplary embodiment in accordance with FIG. 4 in plan view.

FIG. 5 shows the auxiliary substrate 350 in accordance with FIG. 4 in plan view. The figure reveals that, besides the first auxiliary waveguide 410 and the second auxiliary waveguide 440, there are even further auxiliary waveguides, to be precise a third auxiliary waveguide 460 and a fourth auxiliary waveguide 470. The third auxiliary waveguide 460 and the fourth auxiliary waveguide 470 serve for the connection of a further optical component 480, which, by way of example, may likewise be a laser amplifier.

Moreover, FIG. 5 reveals the fixing bumps 360 for fixing the auxiliary substrate 350 on the carrier substrate 310.

The carrier substrate 310 may be for example an electrical optical carrier system, for example an electrical optical motherboard. The carrier substrate may be, in concrete terms, for example an "electrical optical circuit board" (EOCB) or a "planar lightwave circuit" (PLC). The optical arrangement in accordance with FIGS. 4 and 5 is advantageously produced as follows:

Firstly, the optical component 355 is mounted on the auxiliary substrate 350. The adjustment accuracy is not very important in this adjustment, and so tolerances of 5 to 10 μm are acceptable. Consequently, the optical component 355—in the same way as the further optical component 480— can be mounted on the auxiliary substrate 350 using the automatic placement machines that are customary in semiconductor technology.

After the mounting of the optical component 355 or of the further optical component 480 on the auxiliary substrate 350, the premounted auxiliary substrate 350 is inserted into the depression 340 of the carrier substrate 310. This mounting may also exhibit certain tolerances, so that once again it is possible to use customary automatic placement machines from the semiconductor industry.

As soon as the auxiliary substrate 350 has been mounted on the carrier substrate 310, the waveguide ends 400 and 420 of the first auxiliary waveguide 410 and also the two waveguide ends 430 and 450 of the second auxiliary waveguide 440 are aligned in such a way as to achieve an optimum optical connection between the optical component 355 and the two waveguides 320 and 330 of the carrier substrate 310.

As already mentioned above, the carrier substrate 310 in accordance with FIGS. 4 and 5 or the carrier substrate 100 in accordance with FIGS. 1 and 2 may be a so-called PLC (planar lightwave circuit) or an EOCB (electrical optical circuit board). EOCBs are preferably to be used for multimode applications, whereas PLCs can be used for multi- or single-mode applications.

In the case of PLCs, one or more functional layers (e.g. made of glass, silicon, polymers, metals or any desired combination of these materials) may be deposited on the carrier substrate material (e.g., glass or silicon) and be structured by various technologies in order to form the waveguides 320, 330 in the carrier substrate 310.

However, many functions (e.g., filters) may be realized directly by suitable structuring of the EOCB or PLC platform 310 or 100. Other functions or functional units are then adjusted—as explained in connection with FIGS. 1 to 5—by mounting the corresponding elements on the EOCB or PLC platform 310 or 100 in the manner described.

Although the invention has been illustrated and described with respect to one or more implementations, alterations and/or modifications may be made to the illustrated examples without departing from the spirit and scope of the appended claims. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

LIST OF REFERENCE SYMBOLS

10 Optical arrangement
20 Optical component
30 Connection of the optical component
40 Auxiliary substrate
50 First waveguide end
60 Auxiliary waveguide
70 Second waveguide end
80 Waveguide end
90 Waveguide
100 Carrier substrate 110 Separate carrier
200 Electrical contact
210 Electrical contact
220 Arrow (direction of movement)
230 Waveguide in laterally deflected position
240 Waveguide in vertically deflected position
300 Optical arrangement
310 Carrier substrate
320 First waveguide
330 Second waveguide
340 Depression
350 Auxiliary substrate
355 Optical component
360 Fixing bumps
370 First connection
380 Second connection
400 First waveguide end
410 First auxiliary waveguide
420 Second waveguide end
430 First waveguide end
440 Second auxiliary waveguide
450 Second waveguide end
460 Third auxiliary waveguide
470 Fourth auxiliary waveguide
480 Further optical component

What is claimed is:

1. A method for producing an optical arrangement, comprising:
   optically coupling an optical component with a waveguide;
   interposing an adjustment device having an auxiliary waveguide associated therewith between the optical component and the waveguide, the auxiliary waveguide having ends, wherein at least one of the ends is movable;
   moving one of the at least one movable waveguide ends, thereby establishing a predetermined optical coupling between the optical component and the waveguide;
   providing a carrier substrate;
   associating the optical component and the waveguide with the carrier substrate, wherein the carrier substrate comprises an electrical optical motherboard, an electrical optical circuit board, or a planar lightwave circuit;
   providing an auxiliary substrate on or within the carrier substrate;
   providing the adjustment device having the auxiliary waveguide on or within the auxiliary substrate; and
   mounting the optical component on or within the auxiliary substrate, wherein the adjustment device and the carrier substrate are mounted on a separate carrier substrate.

2. A method for producing an optical arrangement, comprising:
   optically coupling an optical component with a waveguide;
   interposing an adjustment device having an auxiliary waveguide associated therewith between the optical component and the waveguide, the auxiliary waveguide having ends, wherein at least one of the ends is movable;
   moving one of the at least one movable waveguide ends, thereby establishing a predetermined optical coupling between the optical component and the waveguide;
   providing a carrier substrate;
   associating the optical component and the waveguide with the carrier substrate, wherein the carrier substrate comprises an electrical optical motherboard, an electrical optical circuit board, or a planar lightwave circuit;
   providing an auxiliary substrate on or within the carrier substrate;
   providing the adjustment device having the auxiliary waveguide on or within the auxiliary substrate; and
   mounting the optical component on or within the auxiliary substrate.

3. The method of claim 1, wherein the carrier substrate comprises a glass substrate, a silicon substrate or a silicon-on-insulator (SOI) substrate, and wherein the waveguide associated with the carrier substrate comprises a glass waveguide or a polymer waveguide.

4. The method of claim 1, further comprising fixing the at least one movable end of the auxiliary waveguide after establishing the predetermined optical coupling.

5. The method of claim 2, further comprising forming a depression within a surface of the carrier substrate, wherein the auxiliary substrate is mounted on or within the carrier substrate depression.

6. The method of claim 5, wherein the depression is dimensioned such that the auxiliary waveguide of the adjustment device and the waveguide associated with the carrier substrate lie in a single plane.

7. The method of claim 6, further comprising providing fixing elements within the depression between the carrier substrate and the auxiliary substrate.

8. The method of claim 7, wherein the fixing elements are electrically conductive and provide electrical contact between the carrier substrate and the adjustment device associated with the auxiliary substrate.

9. The method of claim 1, further comprising adapting a mode field of the waveguide or the optical component with a mode field of the waveguide or the optical component with a mode field of the auxiliary waveguide.

10. The method of claim 1, wherein moving one of the movable waveguide ends comprises deflecting the at least one movable waveguide ends with one of electrostatic, magnetic, thermal, piezoelectric and thermomechanical forces.

11. The method of claim 1, wherein moving one of the movable waveguide ends comprises moving the at least one movable waveguide end in a direction perpendicular to a longitudinal direction of the auxiliary waveguide.

12. The method of claim 1, wherein moving one of the movable waveguide ends comprises moving the movable end in a manner to achieve a predetermined optical attenuation between the optical component and the waveguide.

13. The method of claim 1, wherein a space exists between the adjustment device and the optical component, further comprising filling the space with a composite composition having a refractive index associated with the adjustment device and the optical component.

14. The method of claim 1, wherein the optical component comprises a semiconductor optical laser or a semiconductor optical amplifier.

15. The method of claim 1, further comprising interposing a second adjustment device having an auxiliary waveguide associated therewith between the optical component and the waveguide, the auxiliary waveguide of the second adjustment device having ends, wherein at least one of the ends is movable.

16. An optical system, comprising:
   an optical component in optical communication with a waveguide, wherein the waveguide resides on or within a carrier substrate, and forms an electrical optical carrier system, wherein the carrier substrate comprises an electrical optical motherboard, an electrical optical board, or a planar lightwave circuit; and an adjustment device interposed between the optical component and the waveguide, the adjustment device comprising an auxiliary waveguide having ends, wherein at least one of the ends is movable to facilitate a predetermined optical coupling between the optical component and the waveguide, wherein the adjustment device comprising the auxiliary waveguide is formed on or within an auxiliary substrate and wherein the optical component is mounted on the adjustment device that is connected to the carrier substrate.

17. The optical waveguide system of claim 16, wherein the carrier substrate comprises a glass substrate, a silicon substrate, or a silicon-on-insulator (SOI) substrate, and the waveguide comprises a glass waveguide or a polymer waveguide.

18. The optical system of claim 16, wherein the optical component and the adjustment device define a space therebetween, and wherein the space is filled with a composite composition having a refractive index associated with the optical component and the adjustment device.

19. The optical system of claim 16, wherein the optical component comprises an optical laser amplifier mounted to a carrier substrate.

20. The optical system of claim 16, wherein the adjustment device further comprises a second auxiliary waveguide having ends, wherein at least one of the ends is movable.

21. The optical system of claim 16, wherein a mode field of the auxiliary waveguide is adapted to a mode field of the optical component or the waveguide.

22. The optical system of claim 16, further comprising a holding component operable to fix the one or more movable ends of the auxiliary waveguide upon establishing the predetermined optical coupling between the optical component and the waveguide.

23. The optical system of claim 16, wherein the adjustment device is placed on or within a depression on a surface of the carrier substrate.

24. The optical system of claim 23, wherein the depression is dimensioned such that the auxiliary waveguide of the adjustment device and the waveguide of the carrier substrate are coplanar.

25. The optical system of claim 23, further comprising fixing elements in the depression between the adjustment device and the carrier substrate.

26. The optical system of claim 25, wherein the fixing elements are electrically conductive and provide electrical contact between the adjustment device and the carrier substrate.

27. The optical system of claim 16, wherein the adjustment device and the carrier substrate are mounted on a separate carrier substrate.

28. The optical system of claim 16, wherein the at least one movable end of the auxiliary waveguide is operable to be deflected and adjusted by an electrostatic, magnetic, thermal, piezoelectric or thermomechanical force.

29. The optical system of claim 16, wherein the at least one movable end of the auxiliary waveguide is operable to move in a direction generally perpendicular to a longitudinal direction of the auxiliary waveguide.

30. The optical system of claim 16, wherein at least one of the ends of the auxiliary waveguide is moved to establish a predetermined optical attenuation between the optical component and the waveguide.

* * * * *

UNITED STATES PATENT AND TRADEMARK OFFICE
CERTIFICATE OF CORRECTION

| | |
|---|---|
| PATENT NO. | : 7,371,016 B2 |
| APPLICATION NO. | : 10/686982 |
| DATED | : May 13, 2008 |
| INVENTOR(S) | : Baumann et al. |

It is certified that error appears in the above-identified patent and that said Letters Patent is hereby corrected as shown below:

Column 10
Line 36, change "deflecting the" to --deflecting one of the--

Signed and Sealed this

Sixth Day of July, 2010

David J. Kappos
*Director of the United States Patent and Trademark Office*